US009607252B2

(12) United States Patent
Sawada

(10) Patent No.: US 9,607,252 B2
(45) Date of Patent: Mar. 28, 2017

(54) IMAGE PROCESSING APPARATUS, IMAGE FORMING SYSTEM, AND PRINTING METHOD THAT DECIDE WHETHER TO STORE, PRINT AND NOT STORE, OR PRINT AND STORE IMAGE DATA

(71) Applicant: Nozomi Sawada, Tokyo (JP)

(72) Inventor: Nozomi Sawada, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/167,281

(22) Filed: Jan. 29, 2014

(65) Prior Publication Data
US 2014/0146337 A1 May 29, 2014

Related U.S. Application Data

(60) Continuation of application No. 13/852,737, filed on Mar. 28, 2013, now Pat. No. 8,730,513, which is a (Continued)

(30) Foreign Application Priority Data

Dec. 22, 2000 (JP) ................................. 2000-391315
Dec. 13, 2001 (JP) ................................. 2001-380453

(51) Int. Cl.
*G06F 3/12* (2006.01)
*G06K 15/00* (2006.01)
(Continued)

(52) U.S. Cl.
CPC ......... *G06K 15/1868* (2013.01); *G03B 27/52* (2013.01); *G06F 3/1297* (2013.01);
(Continued)

(58) Field of Classification Search
None
See application file for complete search history.

(56) References Cited

U.S. PATENT DOCUMENTS 4,694,352 A  9/1987 Ina et al.
4,789,900 A  12/1988 Takahashi
(Continued)

FOREIGN PATENT DOCUMENTS

JP  4-286455  10/1992
JP  4-358868  12/1992
(Continued)

OTHER PUBLICATIONS

Fumitaka Maruo, Japanese Patent Publication Hei 10-129071, May 1998.
(Continued)

*Primary Examiner* — Dov Popovici
(74) *Attorney, Agent, or Firm* — Oblon, McClelland, Maier & Neustadt, L.L.P.

(57) ABSTRACT

An image forming apparatus is provided with a storage unit for storing setting information including at least a size of a substitute recording medium, and a processing unit for executing a print instruction by automatically changing a size of a recording medium to be used to the size of the substitute recording medium based on the setting information stored in the storage unit, when the size of the recording medium specified by the print instruction is not available.

26 Claims, 16 Drawing Sheets

Related U.S. Application Data continuation of application No. 13/443,915, filed on Apr. 11, 2012, now Pat. No. 8,760,711, which is a continuation of application No. 10/768,023, filed on Feb. 2, 2004, now Pat. No. 8,179,559, which is a division of application No. 10/023,707, filed on Dec. 21, 2001, now Pat. No. 6,775,488.

(51) Int. Cl.

| | | |
|---|---|---|
| G06K 15/02 | (2006.01) | |
| G03B 27/52 | (2006.01) | |
| H04N 1/00 | (2006.01) | |
| H04N 1/23 | (2006.01) | |
| H04N 1/32 | (2006.01) | |
| H04N 1/393 | (2006.01) | |
| H04N 1/46 | (2006.01) | |

(52) U.S. Cl.
CPC ..... *G06K 15/4065* (2013.01); *H04N 1/00244* (2013.01); *H04N 1/00278* (2013.01); *H04N 1/00774* (2013.01); *H04N 1/2307* (2013.01); *H04N 1/2323* (2013.01); *H04N 1/2338* (2013.01); *H04N 1/2353* (2013.01); *H04N 1/2369* (2013.01); *H04N 1/2392* (2013.01); *H04N 1/32635* (2013.01); *H04N 1/32657* (2013.01); *H04N 1/32673* (2013.01); *H04N 1/393* (2013.01); *H04N 1/46* (2013.01); *H04N 2201/0094* (2013.01)

(56) References Cited

U.S. PATENT DOCUMENTS

| | | | |
|---|---|---|---|
| 4,908,672 A | 3/1990 | Masazumi | |
| 4,922,295 A | 5/1990 | Takano et al. | |
| 4,938,467 A | 7/1990 | Honjo et al. | |
| 4,944,031 A | 7/1990 | Yoshino et al. | |
| 5,031,116 A | 7/1991 | Shukunami et al. | |
| 5,061,958 A | 10/1991 | Bunker et al. | |
| 5,146,343 A | 9/1992 | Fujii | |
| 5,150,224 A | 9/1992 | Mizude et al. | |
| 5,208,902 A | 5/1993 | Kumon | |
| 5,229,814 A | 7/1993 | Hube et al. | |
| 5,267,727 A | 12/1993 | DeHority | |
| 5,289,236 A | 2/1994 | Yoshino | |
| 5,390,005 A | 2/1995 | Kimoto et al. | |
| 5,448,346 A | 9/1995 | Tabata | |
| 5,589,948 A | 12/1996 | Itezono | |
| 5,608,494 A | 3/1997 | Ogura et al. | |
| 5,617,518 A | 4/1997 | Kuwamoto et al. | |
| 5,718,520 A | 2/1998 | MacKay | |
| 5,845,057 A | 12/1998 | Takeda et al. | |
| 5,917,612 A | 6/1999 | Yoshida | |
| 5,918,088 A | 6/1999 | Rikima | |
| 5,956,466 A * | 9/1999 | Horiuchi et al. | 358/1.9 |
| 5,959,744 A | 9/1999 | Kohri et al. | |
| 6,018,397 A | 1/2000 | Cloutier et al. | |
| 6,160,629 A | 12/2000 | Tang et al. | |
| 6,187,405 B1 | 2/2001 | Rudin | |
| 6,188,490 B1 * | 2/2001 | Miyake | G06K 15/02 358/1.18 |
| 6,198,548 B1 | 3/2001 | Yoshikawa et al. | |
| 6,202,092 B1 | 3/2001 | Takimoto | |
| 6,266,512 B1 | 7/2001 | De Koning et al. | |
| RE37,812 E | 8/2002 | Ishikura et al. | |
| 6,512,599 B1 | 1/2003 | Hattori | |
| 6,559,967 B1 * | 5/2003 | Akiba | H04N 1/00411 358/1.13 |
| 6,606,466 B2 | 8/2003 | Sato | |
| 6,611,347 B1 | 8/2003 | Okada et al. | |
| 6,762,856 B2 | 7/2004 | Farrell et al. | |
| 6,775,488 B2 | 8/2004 | Sawada | |
| 6,817,794 B2 | 11/2004 | Kakutani | |
| 6,930,796 B1 | 8/2005 | Matsuura et al. | |
| 7,023,565 B1 | 4/2006 | Hino | |
| 7,034,954 B1 * | 4/2006 | Utsunomiya | 358/1.16 |
| 7,274,474 B2 * | 9/2007 | Yamaguchi et al. | 358/1.15 |
| 7,808,663 B2 | 10/2010 | Teranishi et al. | |
| 2006/0176531 A1 | 8/2006 | Sawada | |

FOREIGN PATENT DOCUMENTS

| | | |
|---|---|---|
| JP | 7-223341 | 8/1995 |
| JP | 8-179906 | 7/1996 |
| JP | 9-311769 | 12/1997 |
| JP | 10-129072 | 5/1998 |
| JP | Hei 10-129072 | 5/1998 |
| JP | 10-190920 | 7/1998 |
| JP | 2000-263874 | 9/2000 |

OTHER PUBLICATIONS

Office Action mailed Sep. 12, 2014 in co-pending U.S. Appl. No. 14/272,949.

\* cited by examiner

FIG.2

| USER ID | PAPER SIZE | SUBSTITUTE PAPER SIZE | ZOOM |
|---|---|---|---|
| 00000001 | LT | A4 | × |
|  | B5 | A4 | ○ |
|  | B4 | A3 | ○ |
| 00000002 | LT | A4 | × |
|  | LG | B4 | × |
| 00000003 | FREE (200 × 280) | A4 | × |
|  | FREE (180 × 260) | A4 | × |

FIG.3

| APPARATUS NAME | APPARATUS INFORMATION |
|---|---|
| Printer 1 | RICOH Aficio AP3200 |
| Printer 2 | RICOH Aficio AP2700 |
| Printer 3 | RICOH Aficio AP2222 |

↑

Select  ↓

FIG.4

| APPARATUS NAME | APPARATUS INFORMATION |
|---|---|
| Printer 1 | RICOH Aficio AP3200 |
| Printer 2 | |
| Printer 3 | |

USER ID [         ]

OK   Cancel

Select  ↓

FIG.9

@psize_set
00000001:LT-A40,B5-A41,B4-A31
00000002:LT-A40,LG-B40
00000003:
@psize_end

FIG.10

| PAPER CONVERSION SETTING |
|---|
| USER ID [       ]       [ OK ]  [ Cancel ] |

FIG.11

| SIZE | SUBSTITUTE SIZE | ZOOM |
|---|---|---|
| LT | A4 | × |
| B5 | A4 | ○ |

PAPER CONVERSION SETTING

[ ↑ ] [ ↓ ] [ OK ] [ Cancel ]

FIG.12

| PAPER CONVERSION SETTING | | |
|---|---|---|
| SIZE | SUBSTITUTE SIZE | ZOOM |
| LT | A4 | × |

[ Add ]　[ Delete ]　[ Cancel ]

FIG.13

| PAPER CONVERSION SETTING | | |
|---|---|---|
| SIZE | SUBSTITUTE SIZE | ZOOM |
| LT | A4 | × |

[ ↑ ]　[ ↓ ]　[ OK ]　[ Cancel ]

FIG.14

| PAPER CONVERSION SETTING | | |
|---|---|---|
| SIZE | SUBSTITUTE SIZE | ZOOM |
| LT | A4 | × |

[ ↑ ] [ ↓ ] [ OK ] [ Cancel ]

FIG.15

| PAPER CONVERSION SETTING | | |
|---|---|---|
| SIZE | SUBSTITUTE SIZE | ZOOM |
| LT | A4 | × |

[ ↑ ] [ ↓ ] [ OK ] [ Cancel ]

FIG.22

```
^[%-12345X@PJL JOB NAME="abc"
@PJL COMMENT RPJL,WINNT4.0,PCL6,0.1.6,GRAYSCALE
@PJL SET USERID="00000001"
@PJL SET TIME="10:07:20"
@PJL SET DATE="2001/11/19"
@PJL SET TRACKID="AUIRWAAADc1DqWQ"
```

IMAGE PROCESSING APPARATUS, IMAGE FORMING SYSTEM, AND PRINTING METHOD THAT DECIDE WHETHER TO STORE, PRINT AND NOT STORE, OR PRINT AND STORE IMAGE DATA

CROSS REFERENCE TO RELATED APPLICATION

The present continuation application claims the benefit under 35 U.S.C. 120 to application Ser. No. 13/852,737, filed Mar. 28, 2013, which is a continuation of Ser. No. 13/443,915, filed Apr. 11, 2012, which is a continuation of application Ser. No. 10/768,023, filed Feb. 2, 2004, now patented, which is a divisional of U.S. application Ser. No. 10/023,707, filed Dec. 21, 2001, now patented and claims the benefit of priority under 35 U.S.C. 119 from Japanese Application No. 2000-391315, filed on Dec. 22, 2000 and from Japanese Application No 2001-380453, filed on Dec. 13, 2001, the entire contents of application Ser. No. 13/443, 915, application Ser. No. 10/768,023, application Ser. No. 10/023,707 and Japanese Application Nos. 2000-391315 and 2001-380453 are incorporated herein by reference.

FIELD OF THE INVENTION

The present invention generally relates to image forming apparatuses, image forming methods and computer-readable storage media, and more particularly to an image forming apparatus which is provided with a function of forming images on recording media such as paper having different sizes, an image forming method for forming images on recording media such as paper having different sizes, and a computer-readable storage medium which stores a computer program for setting setting information for use by such an image forming method.

DESCRIPTION OF THE RELATED ART

Image forming apparatuses include printing apparatuses, copying machines, facsimile machines, composite apparatuses having multiple functions, and the like which are provided with at least a function of printing an image on a recording medium such as paper. Of such image forming apparatuses, there is an image forming apparatus having a construction which enables papers of a plurality of different sizes to be set simultaneously. In the case of the image forming apparatus having such a construction, a user can specify a paper size to be printed, such as characters and images, the kind of the data to be printed, and the user's needs. For example, in the case of a printing apparatus, the user specifies the paper size to be used with respect to the printing apparatus from a host unit such as a personal computer. In the case of a copying machine, the user specifies the paper size to be used from an operation panel of the copying machine.

The need for the printing using different paper sizes is increasing due to expanding work on the international scale and the increasing varieties of printed materials. For example, when creating a document in a first country for use in a second country, the document may be printed on a paper size which is commonly used in the second country but not in the first country. In addition, when the user acquires a PDF file from a Web site on the Internet, there are cases where the printing can only be made on a paper size which is specified by the Web site. Accordingly, it is becoming increasingly important to be able to print on various paper sizes.

However, particularly in an image forming apparatus which is frequently used, the paper in the image forming apparatus easily runs out. For this reason, when the user instructs the printing to the image forming apparatus, the paper having the paper size specified by the print instruction may have run out in the image forming apparatus. When the paper of the specified paper size has run out, the print job is interrupted and the printing must wait until the paper of the specified paper size is supplied and set in the image forming apparatus.

In addition, when different paper sizes are set in the image forming apparatus in a state where the paper of each paper size is accommodated within a corresponding cassette, and the number of cassettes that may be set in the image forming apparatus is small, the possibility that the cassette which accommodates the paper of the specified paper size is not set in the image forming apparatus when the print instruction is sent to the image forming apparatus increases. When the cassette which accommodates the paper of the specified paper size is not set in the image forming apparatus, the print job is interrupted and the printing must wait until the cassette which accommodates the paper of the specified paper size is set in the image forming apparatus.

When the paper of the specified paper size runs out in the conventional image forming apparatus, the print job is interrupted and the printing must wait until the paper of the specified paper size is supplied and set in the image forming apparatus. In addition, when the cassette which accommodates the paper of the specified paper size is not set in the image forming apparatus, the print job is interrupted and the printing must wait until the cassette which accommodates the paper of the specified paper size is set in the image forming apparatus. For this reason, there was a problem in that it is impossible to carry out the printing efficiently.

Moreover, since the printing using the specified paper size cannot be made until the paper of the specified paper size is supplied or the cassette which accommodates the paper of the specified paper size is set in the image forming apparatus, the user or the operator must quickly supply the paper of the specified paper size or set the cassette which accommodates the paper of the specified paper size. As a result, there was a problem in that the load on the user or the operator is large.

Furthermore, when a plurality of print jobs are generated sequentially and one print job is interrupted, the subsequent print jobs must wait until the interrupted print job ends. Hence, there was a problem in that the processing efficiency of the sequential print jobs is extremely poor.

When the paper size specified by the user is not available in the image forming apparatus, the user may wish to print on another paper size which is available in the image forming apparatus. But in this case, the user must cancel the interrupted print job and then issue a new print instruction which specifies another paper size or, instruct a change of the specified paper size with respect to the interrupted print job, and then restart the printing. Consequently, the load on the user is large in that various operations must be made by the user, and there is a problem in that the printing cannot be made efficiently. Particularly when one print job is cancelled in a state where a plurality of print jobs are generated sequentially, the subsequent print jobs will be executed first, and the reinstructed print job will be executed thereafter, thereby causing a delay in executing the reinstructed print job. In addition, even if another paper size is specified, there is no guarantee that this other paper size is available in the image forming apparatus, and the same situation described above will occur and the same operations described above will be required if the paper of this other paper size is not available in the image forming apparatus. In this case, it is even more difficult to carry out the printing efficiently.

SUMMARY OF THE INVENTION

Accordingly, it is a general object of the present invention to provide a novel and useful image forming apparatus, image forming method and computer-readable storage medium, in which the problems described above are eliminated.

Another and more specific object of the present invention is to provide an image forming apparatus, an image forming method and a computer-readable storage medium, which enable corresponding measures to be set in a case where a specified recording medium size is not available when carrying out a printing, so as to reduce the load on a user or operator, and to carry out the printing efficiently, so that print jobs can be executed with a high processing efficiency even if a plurality of print jobs are generated sequentially.

Still another object of the present invention is to provide an image forming apparatus comprising storage means for storing setting information including at least a size of a substitute recording medium, and processing means for executing a print instruction by automatically changing a size of a recording medium to be used to the size of the substitute recording medium based on the setting information stored in the storage means, when the size of the recording medium specified by the print instruction is not available. According to the image forming apparatus of the present invention, it is possible to enable corresponding measures to be set in a case where a specified recording medium size is not available when carrying out a printing, so as to reduce the load on a user or operator, and to carry out the printing efficiently, so that print jobs can be executed with a high processing efficiency even if a plurality of print jobs are generated sequentially. In addition, it is possible to carry out the printing efficiently even when the specified recording medium size is not available, by printing information on the recording medium of the substitute recording medium size, without requiring the user to be aware of the situation.

In the image forming apparatus, the setting information may include whether or not a zoom is required when printing information, and/or a printing position on the recording medium. In this case, it is possible to arbitrarily set in advance the conditions in which the substitute recording medium is to be used.

The image forming apparatus may further comprise means for storing the setting information in the storage means in response to an external setting instruction from outside. In this case, the setting information can be registered from an external host unit or the like.

The image forming apparatus may further comprise means for notifying to the outside when the size of the recording medium specified by the print instruction is not available or when corresponding setting information is not stored in the storage means, together with information indicating an available size of the recording medium, so as to request the setting instruction. In this case, the substitute recording medium size is automatically requested to an external host unit or the like when needed, so that the setting information of the substitute recording medium can be newly registered or updated without requiring the user to be aware of such.

The image forming apparatus may further comprise setting means for setting and storing the setting information in the storage means. In this case, the setting information can be set at the image forming apparatus.

In the image forming apparatus, the setting information may be stored in the storage means in the form of a table. In this case, the setting information can be registered in the form of an easily accessible table.

In the image forming apparatus, the processing means may invalidate the setting information with respect to second and subsequent pages of the recording medium of identical size during one print job. Or, the processing means may invalidate the setting information with respect to corresponding pages of second and subsequent volumes during one print job when printing a plurality of volumes by a stacking or sorting operation. In these cases, it is possible to prevent the recording medium size from being changed to the substitute recording medium size during one print job.

In the image forming apparatus, the setting information may be stored in the storage means with respect to each user. This makes it possible to carry out the printing process efficiently with respect to the print requests from a plurality of users.

A further object of the present invention is to provide an image forming method comprising a reading step reading setting information which includes at least a size of a substitute recording medium from storage means, and a processing step executing a print instruction by automatically changing a size of a recording medium to be used to the size of the substitute recording medium based on the setting information stored in the storage means, when the size of the recording medium specified by the print instruction is not available. According to the image forming method of the present invention, it is possible to enable corresponding measures to be set in a case where a specified recording medium size is not available when carrying out a printing, so as to reduce the load on a user or operator, and to carry out the printing efficiently, so that print jobs can be executed with a high processing efficiency even if a plurality of print jobs are generated sequentially. In addition, it is possible to carry out the printing efficiently even when the specified recording medium size is not available, by printing information on the recording medium of the substitute recording medium size, without requiring the user to be aware of the situation.

In the image forming method, the setting information may include whether or not a zoom is required when printing information, and/or a printing position on the recording medium. In this case, it is possible to arbitrarily set in advance the conditions in which the substitute recording medium is to be used.

The image forming method may further comprise a registering step storing the setting information in the storage means in response to an external setting instruction from outside. In this case, the setting information can be registered from an external host unit or the like.

The image forming method may further comprise a step notifying to the outside when the size of the recording medium specified by the print instruction is not available or when corresponding setting information is not stored in the storage means, together with information indicating an available size of the recording medium, so as to request the setting instruction. In this case, the substitute recording medium size is automatically requested to an external host unit or the like when needed, so that the setting information of the substitute recording medium can be newly registered or updated without requiring the user to be aware of such.

The image forming method may further comprise a setting step setting and storing the setting information in the storage means. In this case, the setting information can be set at the image forming apparatus.

In the image forming method, the setting information may be stored in the storage means in the form of a table. In this case, the setting information can be registered in the form of an easily accessible table.

In the image forming method, the processing step may invalidate the setting information with respect to second and subsequent pages of the recording medium of identical size during one print job. Or, the processing step may invalidate the setting information with respect to corresponding pages of second and subsequent volumes during one print job when printing a plurality of volumes by a stacking or sorting operation. In these cases, it is possible to prevent the recording medium size from being changed to the substitute recording medium size during one print job.

In the image forming method, the setting information may be stored in the storage means with respect to each user. This makes it possible to carry out the printing process efficiently with respect to the print requests from a plurality of users.

Another object of the present invention is to provide a computer-readable storage medium which stores a computer program for causing a computer to print information on a recording medium in response to a print instruction, the computer program comprising a reading procedure causing the computer to read setting information which includes at least a size of a substitute recording medium from storage means, and a processing procedure causing the computer to execute a print instruction by automatically changing a size of a recording medium to be used to the size of the substitute recording medium based on the setting information stored in the storage means, when the size of the recording medium specified by the print instruction is not available. According to the computer-readable storage medium of the present invention, it is possible to enable corresponding measures to be set in a case where a specified recording medium size is not available when carrying out a printing, so as to reduce the load on a user or operator, and to carry out the printing efficiently, so that print jobs can be executed with a high processing efficiency even if a plurality of print jobs are generated sequentially. In addition, it is possible to carry out the printing efficiently even when the specified recording medium size is not available, by printing information on the recording medium of the substitute recording medium size, without requiring the user to be aware of the situation.

Still another object of the present invention is to provide a computer-readable storage medium which stores a computer program for causing a computer to print information on a recording medium in response to a print instruction, the computer program comprising a registering procedure causing the computer to register setting information which includes at least a size of a substitute recording medium to be used when a size of a recording medium specified by the print instruction is not available. According to the computer-readable storage medium of the present invention, it is possible to carry out the printing efficiently even when the specified recording medium size is not available, by printing information on the recording medium of the substitute recording medium size, without requiring the user to be aware of the situation.

The computer-readable storage medium may store the computer program with respect to one of a computer within a host unit which outputs the print instruction with respect to an image forming apparatus and a computer within the image forming apparatus which prints the information on the recording medium. In this case, the setting information can be registered from the host unit or the image forming apparatus.

Other objects and further features of the present invention will be apparent from the following detailed description when read in conjunction with the accompanying drawings.

BRIEF DESCRIPTION OF THE DRAWINGS

FIG. 2 is a diagram showing an embodiment of a specifying table;

FIG. 3 is a diagram showing a menu at a processing stage when setting a specifying table of a user from a host unit;

FIG. 4 is a diagram showing a menu at a processing stage when setting the specifying table of the user from the host unit;

FIG. 9 is a diagram showing setting data supplied from the host unit to a printing apparatus;

FIG. 10 is a diagram showing a menu at a processing stage when setting a specifying table of a user at the printing apparatus;

FIG. 11 is a diagram showing a menu at a processing stage when setting the specifying table of the user at the printing apparatus;

FIG. 12 is a diagram showing a menu at a processing stage when setting the specifying table of the user at the printing apparatus;

FIG. 13 is a diagram showing a menu at a processing stage when setting the specifying table of the user at the printing apparatus;

FIG. 14 is a diagram showing a menu at a processing stage when setting the specifying table of the user at the printing apparatus;

FIG. 15 is a diagram showing a menu at a processing stage when setting the specifying table of the user at the printing apparatus;

FIG. 22 is a diagram for explaining a user ID input transferred to the printing apparatus.

DESCRIPTION OF THE PREFERRED EMBODIMENTS

A description will be given of each embodiment of an image forming apparatus according to the present invention, an image forming method according to the present invention, and a computer-readable storage medium according to the present invention.

Figure 1:
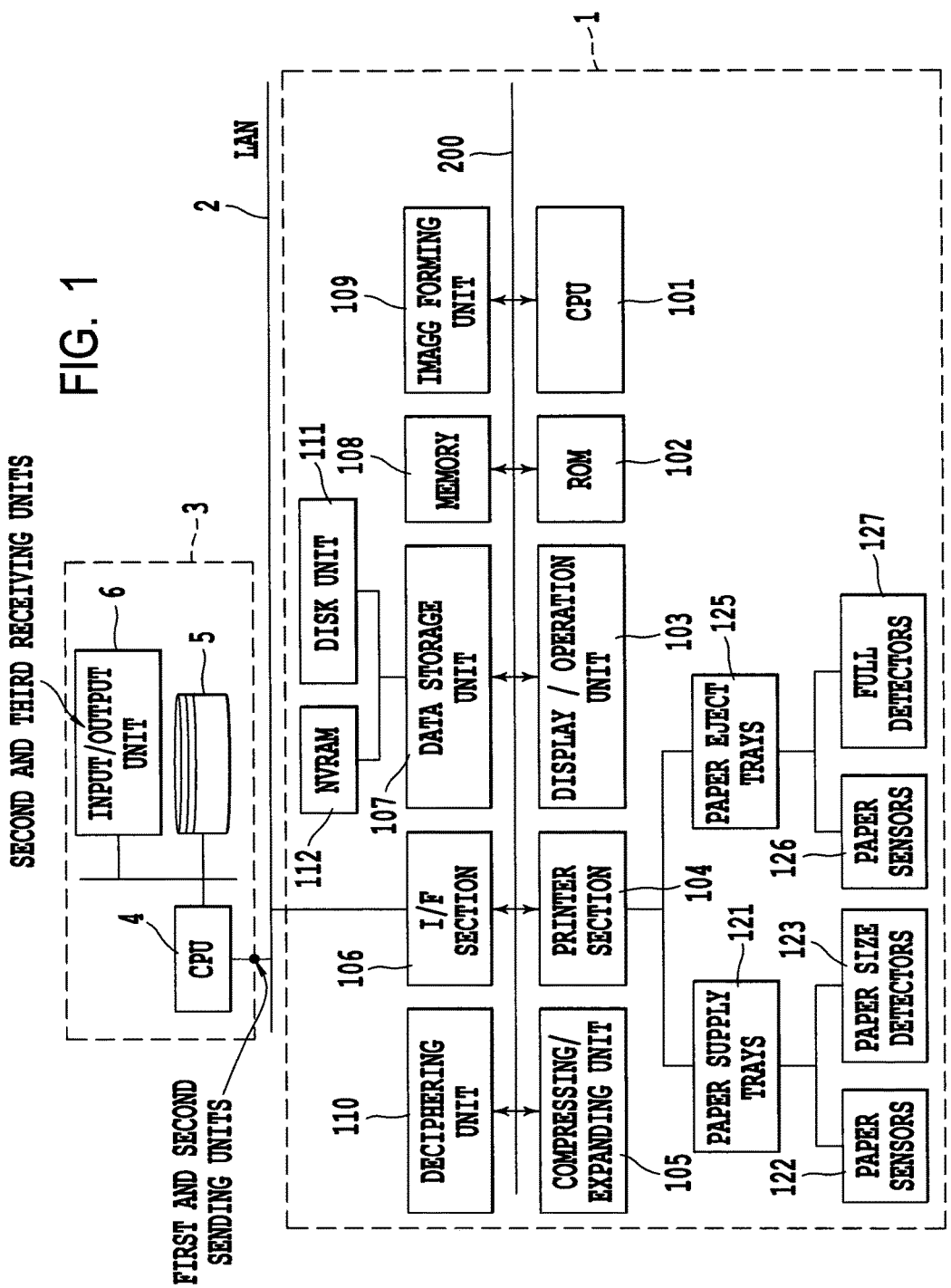
FIG. 1 is a system block diagram showing an embodiment of an image forming apparatus according to the present invention.

FIG. 1 is a system block diagram showing an embodiment of the image forming apparatus according to the present invention. This embodiment of the image forming apparatus employs an embodiment of the image forming method according to the present invention and an embodiment of the computer-readable storage medium according to the present invention. In this embodiment, the present invention is applied to a printing apparatus. For the sake of convenience, in the following description, a case will be described where paper is used as a recording medium on which data (hereinafter referred to as image data) such as characters and images are printed.

In FIG. 1, a printing apparatus 1 is connectable to a host unit 3, such as a server, via a network such as a LAN and WAN. In this embodiment, a description will be given of a case where the printing apparatus 1 is connected to the host unit 3 via a network 2, but the printing apparatus 1 may of course be connected to the host unit 3 via other connecting means such as centronics, 1394, USB. The host unit 3 has a known structure including a CPU 4, a storage unit 5 which may be provided internally or externally to the host unit 3, and an input/output unit 6. The input/output unit 6 includes an input unit such as a keyboard and a mouse, and an output unit such as a display unit. For example, the host unit 3 may be formed by a known personal computer. When issuing a print instruction to the printing apparatus 1, the host unit 3 outputs to the network 2 by a known method the data (image data) such as characters and images which are to be printed, and data (paper size data) which specifies the paper size to be used for the printing. When outputting the print instruction, the host unit 3 may also output user data related to the user of the host unit 3.

The printing apparatus 1 includes a CPU 101, a ROM 102, a display/operation unit 103, a printer section (printer engine) 104, a compressing/expanding unit 105, an interface (I/F) section 106, a data storage unit 107, a memory 108, an image forming unit 109, a deciphering unit 110, a disk unit 111, a nonvolatile (NV) RAM 112, paper supply trays 121, paper sensors 122, paper size detectors 123, paper eject trays 125, paper sensors 126, full detectors 127, and a bus 200.

The CPU 101 forms a processing unit for controlling various parts of the printing apparatus 1 according to a computer program which is stored in the ROM 102. The display/operation unit 103 includes a display unit for displaying messages and various data such as the states within the printing apparatus 1, and an operation unit for inputting instructions and the like to the printing apparatus 1. For the sake of convenience, the display/operation unit 103 in this embodiment is formed by a touch-panel which integrally includes the display unit and the operation unit, but the display unit and the operation unit may be provided independently or, an operation unit may be provided in addition to a touch-panel.

The I/F section 106 receives the print instruction, the image data and the paper size data from the host unit 3 via the network 2, which are then temporarily stored in the memory 108. In a case where the received image data and the like are compressed, the image data and the like are expanded in the compressing/expanding unit 105 before being stored in the memory 108. In addition, in a case where the received image data and the like are enciphered, the image data and the like are deciphered in the deciphering unit 110 before being stored in the memory 108.

The image forming unit 109 develops the image data stored in the memory 108 into a data format, such as bit-map data, which can be output by the printer section 104, and outputs the developed image data to the printer section 104. The image forming unit 109 also includes a function of changing a zoom (magnification or reduction) rate, a zero position (or origin) and the developing start position of the image data, depending on an instruction from the CPU 101. In a case where the image data received from the host unit 3 already have a data format which can be output by the printer section 104, it is of course unnecessary to develop the image data in the image forming unit 109.

The printer section 104 prints the image data which are developed by the image forming unit 109 and stored in the memory 108 on paper having a paper size which is dependent on the paper size data, in response to an instruction from the CPU 101. A printing system employed by the printer section 104 is not limited to a particular system, and the systems such as the electrophotography system and the ink-jet system may be employed.

The paper supply trays 121 are constructed so that paper of a plurality of different paper sizes can be set thereon. The paper supply trays 121 may be constructed to accommodate paper of different paper sizes which are accommodated within corresponding cassettes, that is, constructed to receive the cassettes which are set therein. The paper supply trays 121 have a known construction for supplying to the printer section 104 the paper of the paper size which is dependent on the paper size data, in response to an instruction from the CPU 101. The paper sensors 122 detect the existence of different paper sizes or, detect that the remaining amounts of the different paper sizes have become less than a predetermined amount, and notify the existence or remaining amount to the CPU 101. The paper size detectors 123 detect the different paper sizes which are set, and notify the detected paper sizes to the CPU 101. In other words, the usable or available (hereinafter simply referred to as "usable") paper sizes are detected by the paper size detectors 123, and the paper sizes which have run out or have a small remaining quantity are detected by the paper sensors 122.

The printed paper output from the printer section 104 is ejected to the paper eject trays 125. The paper eject trays 125 have a known construction for stacking or sorting the paper in response to an instruction form the CPU 101. The paper sensors 126 detect the existence of the paper ejected to the paper eject trays 125, and notify the existence to the CPU 101. The full detectors 127 detect a state where the amount of ejected paper has reached a maximum tolerable amount in the corresponding paper eject trays 125, and notify the detected state to the CPU 101.

In this embodiment, the data storage unit 107 is provided with the disk unit 111 and/or the NVRAM 112, and stores a specifying table which will be described later. The data storage unit 107 may be formed by any kind of recording medium or storage device as long as it is possible to store the specifying table. In addition, it is possible to store the specifying table in the memory 108 if the memory 108 includes a nonvolatile memory portion, and in this case, the data storage unit 107 may be omitted.

The basic structure itself of the printing apparatus 1 shown in FIG. 1 is known, and other known basic structures may be used as long as the printing apparatus 1 is provided with a storage means capable of storing the specifying table in a modifiable manner.

The specifying table records the substitute paper sizes to be used when the specified paper sizes to be used to print the image data are not usable, whether the printing is to be made with or without the zoom when printing the image data, the printing position of the image data on the paper, and the like, with respect to each user.

FIG. 2 is a diagram showing an embodiment of the specifying table. For the sake of convenience, FIG. 2 shows setting information with respect to three users who are identified by user IDs. The setting information in this particular case includes the substitute paper size and whether or not the zoom is required. For example, with respect to the user ID "00000001", the setting information indicates that the substitute paper size A4 is used when the paper size LT is not usable, without the zoom as indicated by "x" when using the substitute paper size A4. In addition, the setting information also indicates that the substitute paper size A4 is used when the paper size B5 is not usable, with the zoom as indicated by "o" when using the substitute paper size A4, and that the substitute paper size A3 is used when the paper size B4 is not usable, with the zoom as indicated by "o" when using the substitute paper size A3. The substitute paper size and whether or not the zoom is required do not need to be set for all of the paper sizes.

In FIG. 2, only one substitute paper size is set with respect to each paper size. However, it is possible to set two or more substitute paper sizes with respect to one or more paper sizes. In this case, it is possible to record the setting information in the specifying table so that a substitute paper size B4 is used when a paper size A4 is not usable, and a substitute paper size A3 is used when even the substitute paper size B4 is not usable, for example. In addition, it is possible to set whether or not the zoom is required, with respect to each such substitute paper sizes. Furthermore, it is possible to set in the specifying table the printing position on the paper where the image data is to be printed. The printing position can be controlled by determining the developing start position or the zero position, for example.

In a case where the substitute paper size is smaller than the specified paper size, the zero point is not changed, and the image data is printed after reducing the image data depending on a reduction rate between the specified paper size and the substitute paper size. In a case where the reduction rate between the specified paper size and the substitute paper size can be described by an integer ratio, it is possible not to reduce the image data and to print the image data without changing size using a number of sheets of paper depending on the integer ratio. For example, if the specified paper size is B4 and the substitute paper size is B5, it is possible to print the image data in two sheets of paper having the substitute paper size B5. Accordingly, when the two sheets of printed paper are arranged side by side, it is possible to obtain approximately the same image data as when the printing is image on a single sheet of paper having the specified paper size B4. It is possible to similarly record in the specifying table the number of sheets of paper to be used depending on the reduction rate, with respect to the substitute paper size.

The specifying table may be provided with respect to each user. In this case, the data storage unit 107 may store a user table which records the storage locations (addresses) of the specifying tables corresponding to each of the users. The user table may be created by executing a user table creating program stored in the ROM 102 by the CPU 101 when the specifying table of a new user is created. Of course, the user table creating program may be stored in the disk unit 111, for example. In addition, it is not necessary to provide the specifying table with respect to all of the users, and it is possible not to provide the specifying table with respect to each user not wishing to use a substitute paper size or, to provide a table which records each user not wishing to use a substitute paper size.

The specifying table may be set from the host unit 2 by operating the keyboard or the like of the input/output unit 6 of the host unit 3 or, set at the printing apparatus 1 by operating the operation/display unit 103 of the printing apparatus 1. In addition, the setting contents may all be input to the specifying table from the start or, the setting contents may be input by changing default setting contents which are set in advance in a default specifying table, so as to form the specifying table.

FIGS. 3 through 8 are diagrams showing menus (display screens) displayed on the display unit of the input/output unit 6 at various processing stages when setting the specifying table of the user to the printing apparatus 1 from the host unit 3. For the sake of convenience, a description will be given of a case where the user of the host unit 3 sets the specifying table by inputting all of the setting contents from the start with respect to the printing apparatus 1 having an apparatus name "Printer1".

In the menu shown in FIG. 3, the apparatus names of the printing apparatuses which are connectable to the host unit 3 are displayed together with the apparatus information (model name). The user selects the apparatus name "Printer1" by selecting the "↑" or "↓" button by clicking the mouse, for example, and determines the selection by selecting the "select" button. As a result, the menu switches to the menu shown in FIG. 4.

In the menu shown in FIG. 4, the user is urged to input the user ID, and the user operates the keyboard or the like to input the user ID "00000001", for example, and then determines the selection by selecting the "OK" button. As a result, the menu switches to a setting menu for setting the substitute paper size and whether or not the zoom is required, with respect to each paper size.

Figure 5:
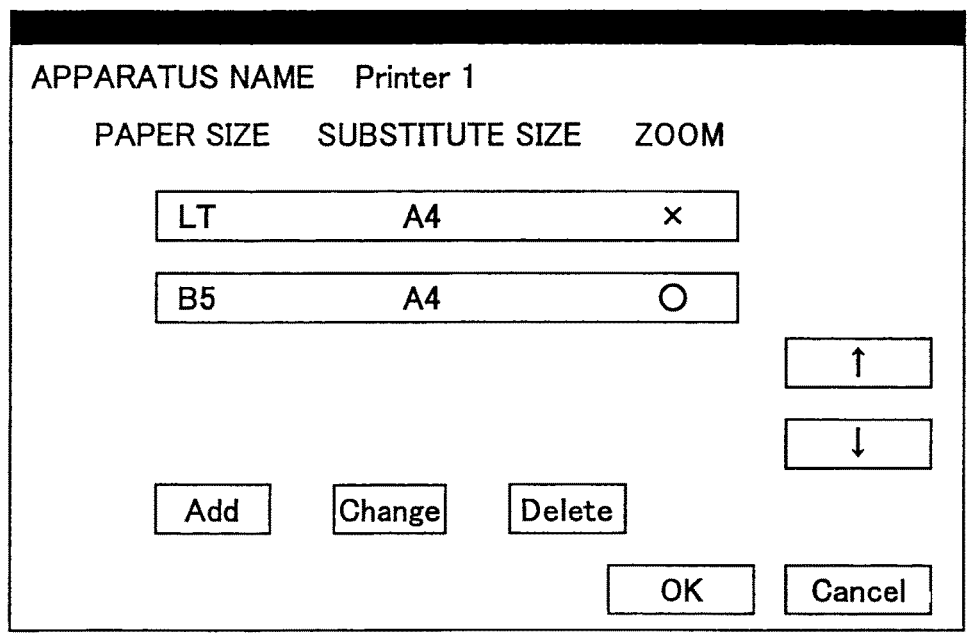
FIG. 5 is a diagram showing a menu at a processing stage when setting the specifying table of the user from the host unit.

FIG. 5 shows a state where the substitute paper sizes (substitute sizes) and whether or not the zoom is required, are set with respect to the paper sizes LT and B5 in such a setting menu. When the "add" button is selected in this menu, the menu switches to the menu shown in FIG. 6, and it becomes possible to set the substitute paper size and whether or not the zoom is required, with respect to the added paper size. The "change" button is selected when changing the set contents, and the "delete" button is selected when deleting the set contents.

Figure 6:
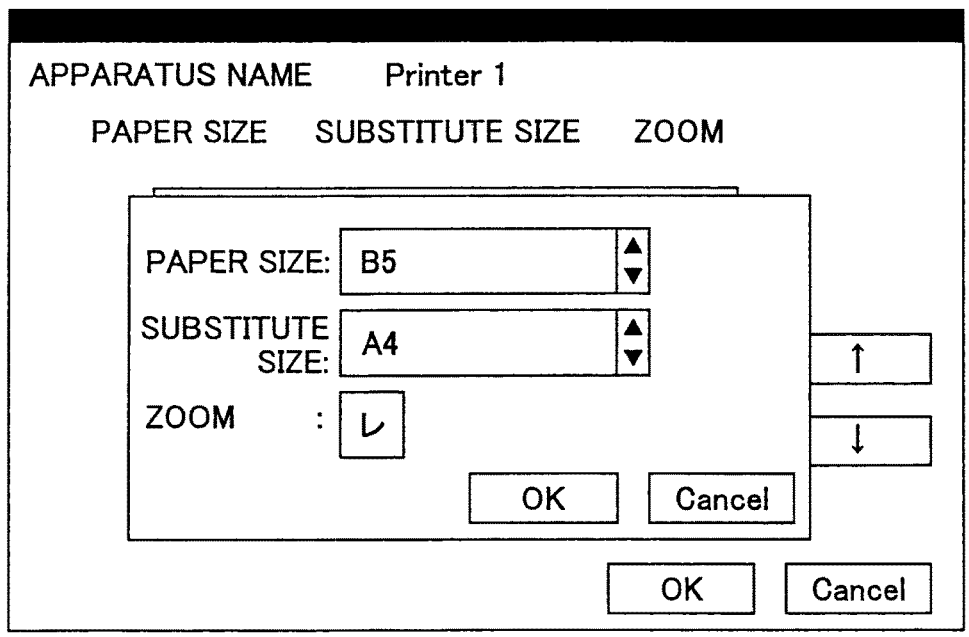
FIG. 6 is a diagram showing a menu at a processing stage when setting the specifying table of the user from the host unit.

FIG. 6 shows a state where the substitute paper size A4 and the printing with the zoom are set with respect to the paper size B5 in the menu. When the "OK" button is selected in this state, the setting with respect to the paper size B5 is determined.

Figure 7:
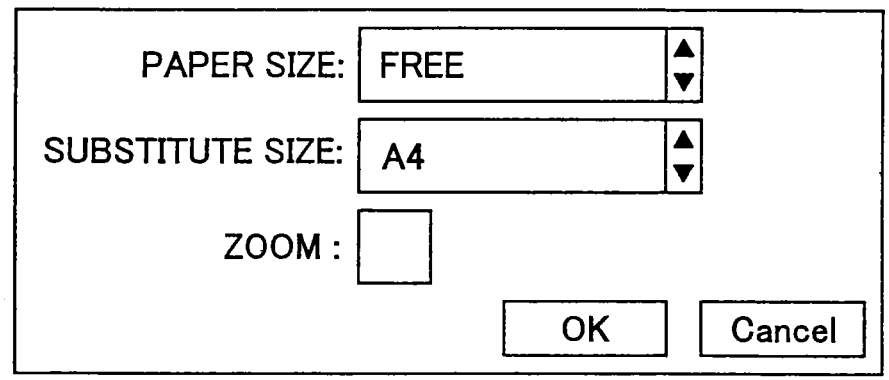
FIG. 7 is a diagram showing a menu at a processing stage when setting the specifying table of the user from the host unit.
Figure 8:
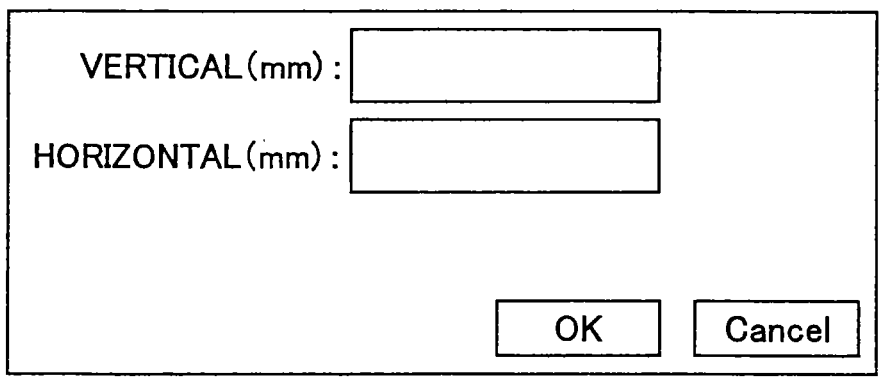
FIG. 8 is a diagram showing a menu at a processing stage when setting the specifying table of the user from the host unit.

The menu shown in FIG. 7 is displayed when the paper size is free, and the substitute paper size is set to a fixed size such as A4 as shown. When the "OK" button is selected in this state, the menu shown in FIG. 8 is displayed to urge the user to input the free paper size, that is, the horizontal and vertical sizes. When the "OK" button is selected after inputting the free paper size, the input free size is determined.

By making the setting described above, the setting data shown in FIG. 9, for example, are supplied from the host unit 3 to the printing apparatus 1. In the printing apparatus 1, the specifying table shown in FIG. 2 is set by the CPU 101 with respect to the user ID "00000001" and stored in the data storage unit 107. In FIG. 9, "00000001", "00000002" and "00000003" indicate the user IDs. For example, "LT-A40" indicates that the substitute paper size for the paper size LT is A4 and the printing is to be made without the zoom ("0"), "B5-A41" indicates that the substitute paper size for the paper size B5 is A4 and the printing is to be made with the zoom ("1").

FIGS. 10 through 15 are diagrams showing menus (display screens) displayed on the display unit of the display/operation unit 103 at various processing stages when setting the specifying table of the user at the printing apparatus 1. For the sake of convenience, a description will be given of a case where the user having a user ID sets the specifying table corresponding to this user ID, with respect to the printing apparatus 1, by changing the default setting contents which are set in advance in the default specifying table, that is, by carrying out a setting data conversion. A conversion log is stored in the data storage unit 107, for example. Of course, some or all of the default setting contents may be blank before the user inputs the desired setting contents.

The menu shown in FIG. 10 urges the user to input the user ID, and after the user inputs the user ID "00000001", for example, the input is determined by selecting the "OK" button. As a result, the menu switches to the menu shown in FIG. 11, in which the default setting contents related to the substitute paper size and whether or not the zoom is required with respect to each paper size, can be changed.

FIG. 11 shows the menu a state where the substitute paper sizes and whether or not the zoom is required are set with respect to the paper sizes LT and B5. The user selects the paper size with respect to which the default setting contents are to be changed, by selecting the "↑" or "↓" button. When changing the default setting contents with respect to the paper size LT, the "OK" button is selected in the menu shown in FIG. 11. As a result, the menu switches to the menu shown in FIG. 12.

When the "change" button is selected in the menu shown in FIG. 12, the menu switches to the menu shown in FIG. 13. When the "OK" button is selected in the menu shown in FIG. 13, the changes to the default setting contents with respect to the paper size LT are determined, and the menu switches to the menu shown in FIG. 14. In the menu shown in FIG. 14, the substitute paper size can be changed by selecting the "↑" or "↓" button. When the "OK" button is selected in the menu shown in FIG. 14, the substitute paper size after the change is determined, and the menu switches to the menu shown in FIG. 15. Whether the printing is to be made with or without the zoom can be changed by selecting the "↑" or "↓" button in the menu shown in FIG. 15. The zoom selection after the change is determined by selecting the "OK" button in the menu shown in FIG. 15.

By making the setting described above, the specifying table shown in FIG. 2 is set by the CPU 101 with respect to the user ID "00000001" and stored in the data storage unit 107, based on the setting data input from the display/operation unit 103.

FIGS. 16 through 19 are flow charts for explaining the operation of this embodiment. The processes shown in FIGS. 16 through 19 are carried out when the printing operation of the printing apparatus 1 is started at a timing which will be described later.

Figure 16:
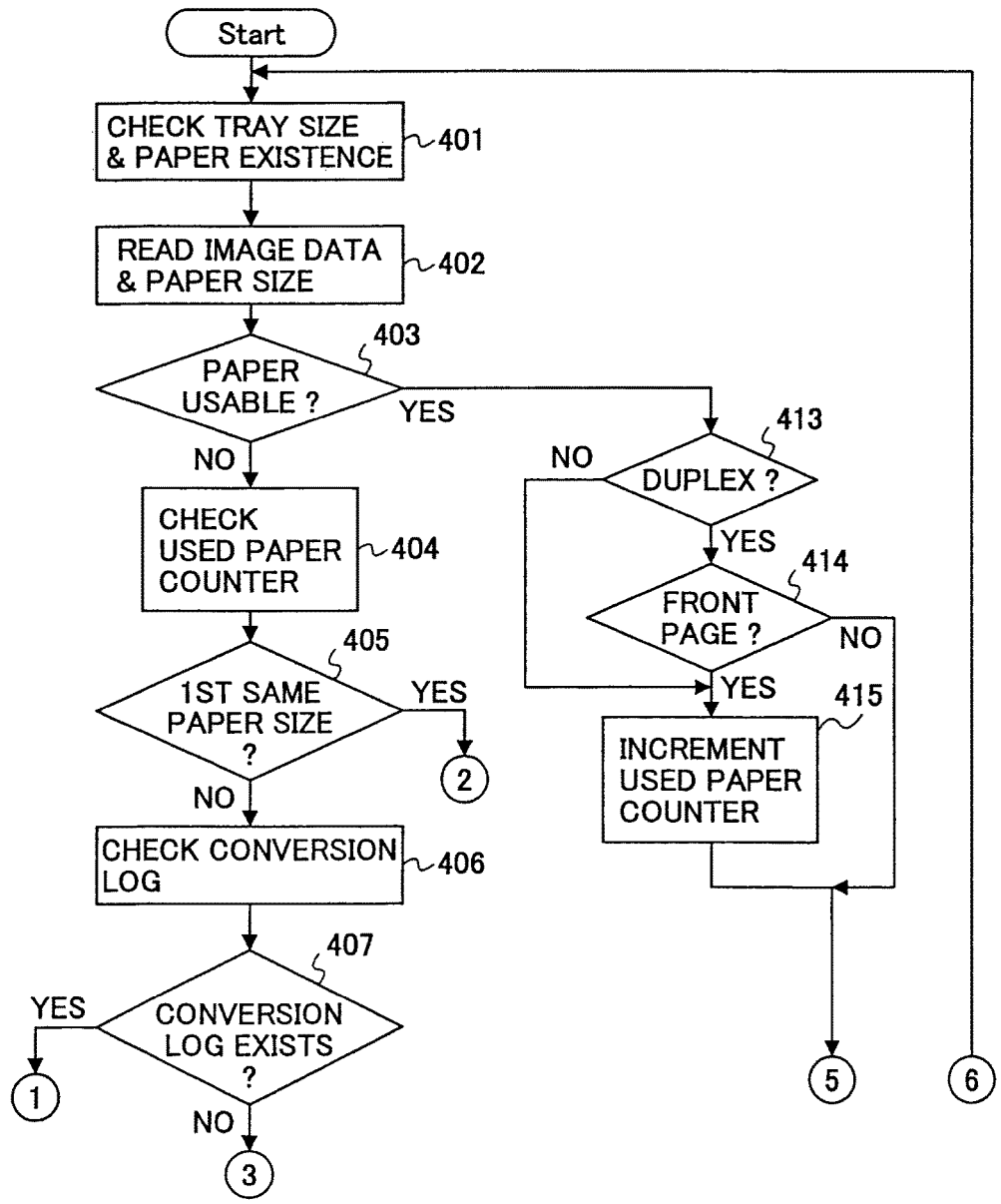
FIG. 16 is a flow chart for explaining the operation of the embodiment.

In FIG. 16, when the printing operation of the printing apparatus 1 is started based on the print instruction from the host unit 3, a step 401 checks the usable (or available) paper sizes and the paper sizes with remaining amounts less than a predetermined amount, based on the outputs of the paper sensors 122 and the paper size detectors 123. A step 402 reads the image data to be printed by the print job and the specified paper size from the memory 108, based on the print instruction. A step 403 decides whether or not the specified paper size is one of the usable paper sizes, and the process advances to a step 404 if the decision result is NO, and the process advances to a step 413 if the decision result is YES.

The step 404 checks a counted value of a used paper counter which counts the number of sheets of paper used in units of jobs for each paper size. The used paper counter itself is known. When realizing the used paper counter by a software counter, the counting is made under the control of the CPU 101, for example, and the counted value is stored in the memory 108, for example. Of course, it is possible to provide a hardware counter exclusively for use as the used paper counter. A step 405 decides whether or not the printing with respect to the same paper size is the first time (that is, first page of the same paper size) within the present print job, and the process advances to a step 406 if the decision result is NO, and the process advances to a step 421 shown in FIG. 18 if the decision result is YES. The step 406 reads the conversion log of the setting data within the present print job from the data storage unit 107 and checks the conversion log. A step 407 decides whether or not the conversion log exists, and the process advances to a step 408 shown in FIG. 17 if the decision result is NO, and the process advances to a step 428 shown in FIG. 18 if the decision result is YES.

A description will be given of the reason why the step 405 decides whether or not the printing with respect to the same paper size is the first time (that is, first page of the same paper size) within the present print job. It is not desirable for the specified paper size to change to the substitute paper size during one print job. Accordingly, in this embodiment, measures are taken so that the same specified paper size or the same substitute paper size is used throughout one print job. In other words, the setting contents which are set in the specifying table are treated as being invalid with respect to the second and subsequent pages of the same paper size during one print job. Similarly, during the printing of a plurality of copies (volumes) by carrying out a stacking or sorting operation within one print job, the setting contents which are set in the specifying table are treated as being invalid with respect to the corresponding pages of the second and subsequent copies (volumes). The step 404 counts the number of sheets of paper used for each paper size, because in the case of a duplex printing which prints on both sides of the paper, it is unnecessary to make the even-numbered pages the subject of the decision in the step 405.

Figure 17:
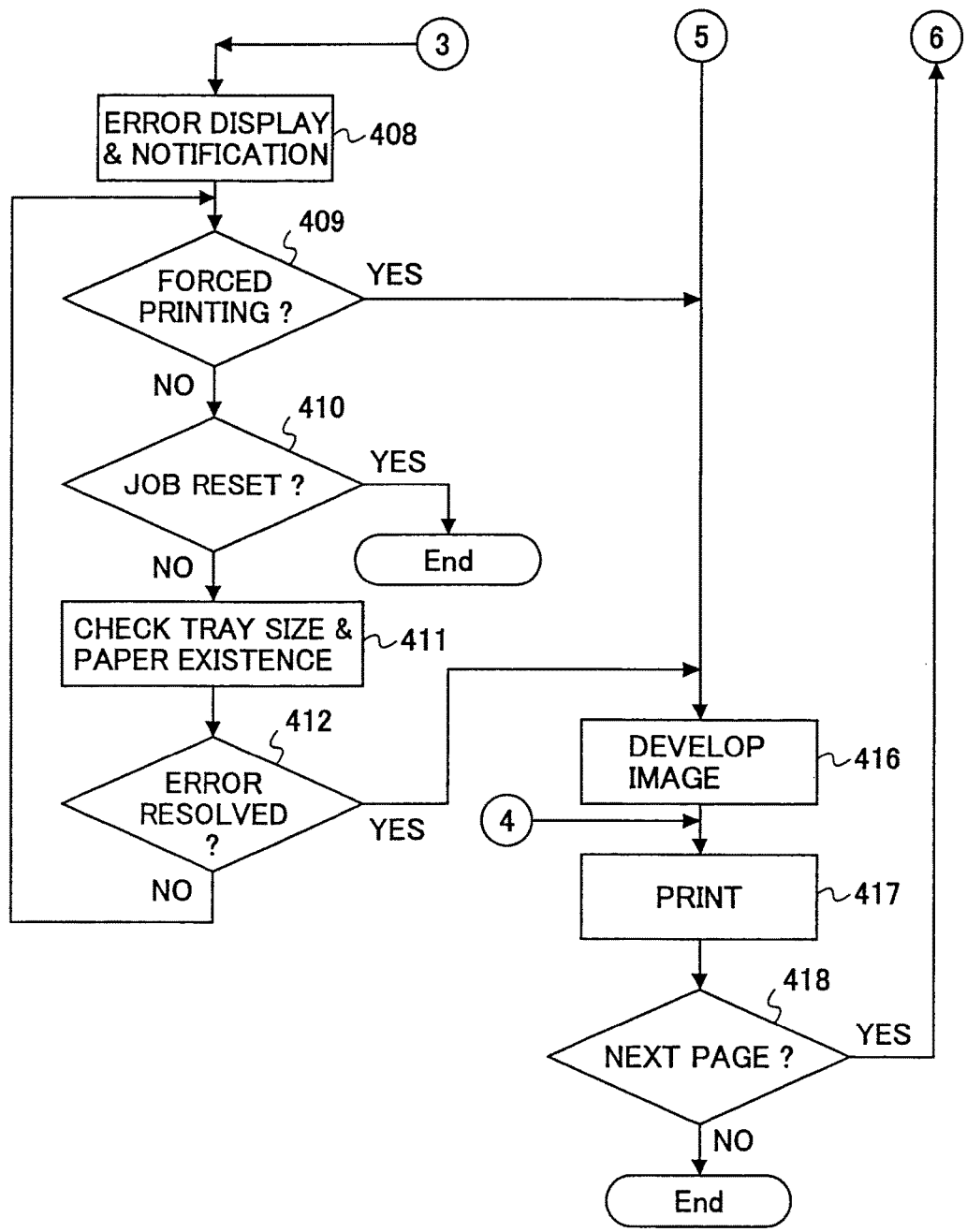
FIG. 17 is a flow chart for explaining the operation of the embodiment.

In FIG. 17, the step 408 makes an error display and error notification with respect to the display/operation unit 103. A step 409 decides whether or not the paper of the specified paper size is supplied and a forced printing is possible, and the process advances to a step 410 if the decision result is NO, and the process advances to a step 416 if the decision result is YES. The step 410 decides whether or not the user made a print job reset instruction (cancel instruction) from the display/operation unit 103, and the process advances to a step 411 if the decision result is NO, and the process ends if the decision result is YES.

The step 411 checks the usable paper sizes and the paper sizes with remaining amounts less than a predetermined amount, based on the outputs of the paper sensors 122 and the paper size detectors 123. A step 412 decides whether or not the error has been resolved, and the process returns to the step 409 if the decision result is NO, and the process advances to the step 416 if the decision result is YES.

When the step 412 decides whether or not the error is resolved, it is possible to forcibly end the process or, to make the decision result in the step 408 YES, if the number of errors exceeds a predetermined value or a predetermined time elapses after the step 408 is carried out, so as to forcibly print on the paper of the usable paper size.

The step 416 develops the image data to be printed in the memory 108 by the image forming unit 109, and a step 417 prints the image data amounting to one page on the paper of the specified paper size by the printer section 104. A step 418 decides whether or not a next page exists, and the process returns to the step 401 shown in FIG. 16 if the decision result is YES, and the process ends if the decision result is NO.

On the other hand, in FIG. 16, the step 413 decides whether or not the print job is related to a duplex printing, and the process advances to a step 414 if the decision result is YES, and the process advances to a step 415 if the decision result is NO. The step 414 decides whether or not the printing page is the front page (first side) or the odd-numbered page, and the process advances to the step 415 if the decision result is YES, and the process advances to the step 416 shown in FIG. 17 if the decision result is NO. The step 415 increments the counted value of the used paper counter in units of jobs by one, and the process advances to the step 416 shown in FIG. 17.

Figure 18:
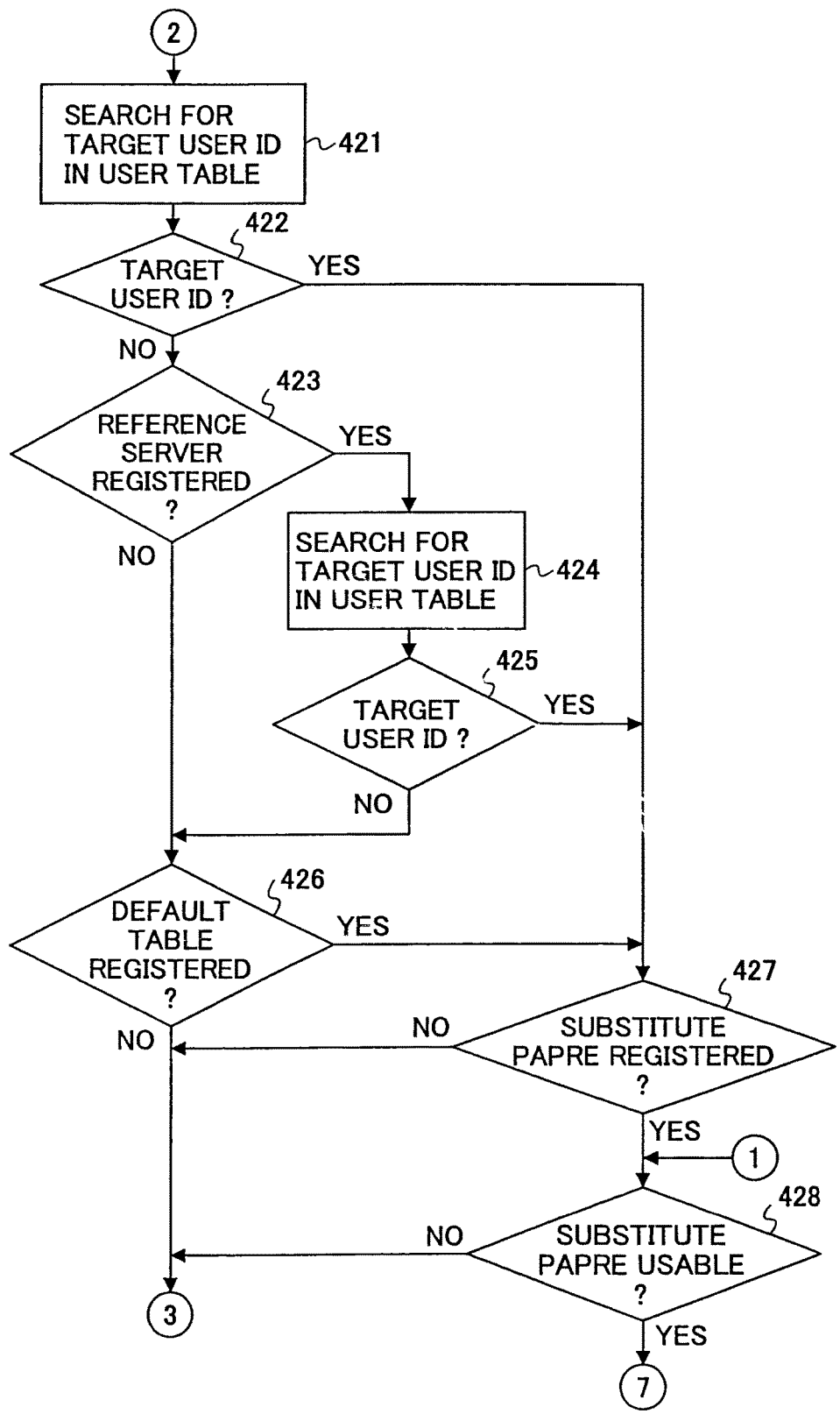
FIG. 18 is a flow chart for explaining the operation of the embodiment.

In FIG. 18, the step 421 searches for a target user ID included in the print instruction, from the user table stored in the data storage unit 107. A step 422 decides whether or not the target user ID exists in the user table, and the process advances to a step 423 if the decision result is NO, and the process advances to a step 427 if the decision result is YES. The step 423 decides whether or not a server (not shown) connected to the network 2 is registered in a storage unit such as the data storage unit 107 as a reference server, and the process advances to a step 424 if the decision result is YES, and the process advances to a step 426 if the decision result is NO. For example, the reference server may be the host unit 3.

The step 424 searches for the target user ID from a user table registered in the storage unit of the reference server. A step 425 decides whether or not the target user ID exists in the user table within the reference server, and the process advances to the step 426 if the decision result is NO, and the process advances to the step 427 if the decision result is YES. The step 426 decides whether or not a default specifying table is stored in the data storage unit 107, and the process advances to the step 427 if the decision result is YES, and the process returns to the step 408 shown in FIG. 17 if the decision result is NO. The step 427 decides whether or not a substitute paper size to be used for the printing is registered in the specifying table, and the process advances to a step 428 if the decision result is YES, and the process returns to the step 408 shown in FIG. 17 if the decision result is NO. The step 428 decides whether or not the paper of the substitute paper size is usable in the printing apparatus 1, based on the outputs of the paper sensors 122 and the paper size detectors 123, and the process advances to a step 429 shown in FIG. 19 if the decision result is YES, and the process returns to the step 408 shown in FIG. 17 if the decision result is NO.

Figure 19:
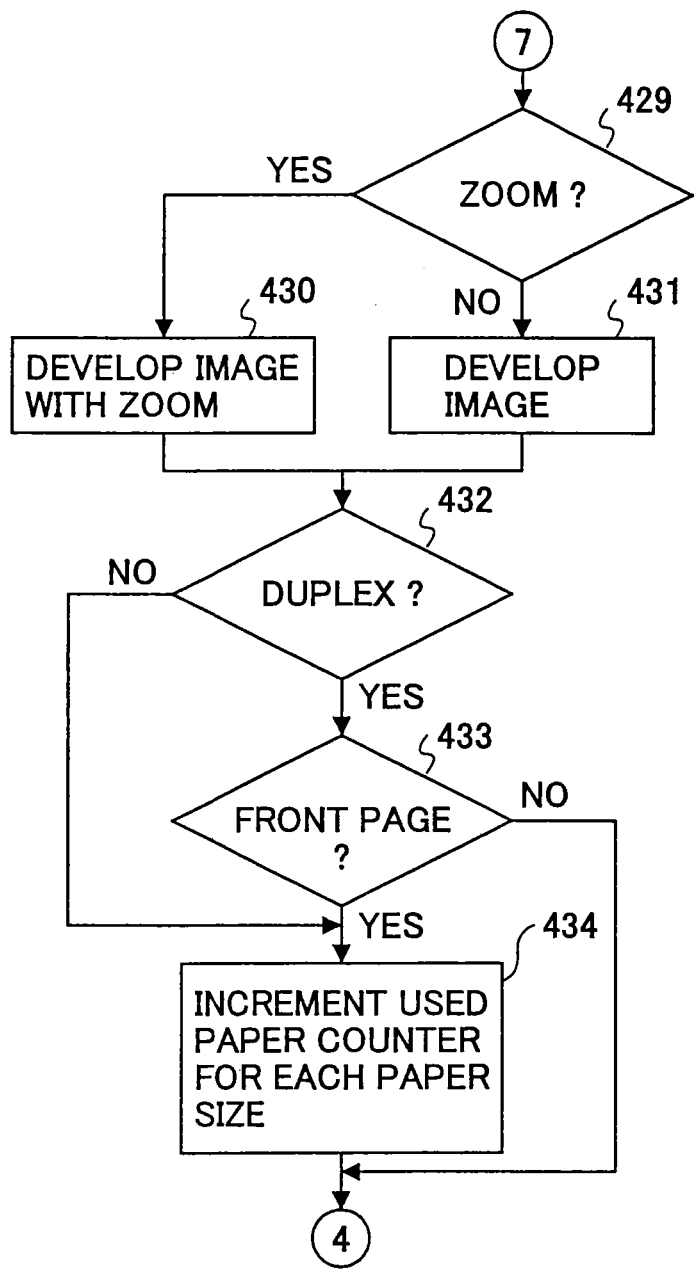
FIG. 19 is a flow chart for explaining the operation of the embodiment.

In FIG. 19, the step 429 decides whether or not information indicating that the printing is to be carried out with zoom is registered in the specifying table, and the process advances to a step 430 if the decision result is YES, and the process advances to a step 431 if the decision result is NO. The step 430 develops the image data in the memory 108 with the registered zoom (zoom rate) by the image forming unit 109, and the process advances to a step 432. On the other hand, the step 431 develops the image data in the memory 108 without zoom by the image forming unit 109, and the process advances to the step 432.

The step 432 decides whether or not the print job relates to a duplex printing, and the process advances to a step 433 if the decision result is YES, and the process advances to a step 434 if the decision result is NO. The step 433 decides whether or not the page to be printed is the front page (first side) or the odd-numbered page, and the process advances to the step 433 if the decision result is YES, and the process advances to the step 417 shown in FIG. 17 of the decision result is NO. The step 434 increments the counted value of the used paper counter in units of jobs by one, and the process advances to the step 417 shown in FIG. 17.

The step 411 shown in FIG. 17 may check and notify to the host unit 3 the usable paper sizes and the paper sizes with remaining amounts less than a predetermined amount, based on the outputs of the paper sensors 122 and the paper size detectors 123, so that the information input by the user in response to this notification is reflected to the specifying table. In other words, the menu shown in FIG. 5 may be displayed on the display unit of the input/output unit 6 of the host unit 3 to notify the usable paper sizes and urge the user to input the substitute paper sizes and the zoom if required, and when the substitute paper sizes and the zoom are input, the specifying table may be generated from the input information or the default specifying table may be updated based on the input information. Accordingly, even when the specified substitute paper size cannot be used in the printing apparatus 1 or, the specifying table is not generated or, the substitute paper size is not registered in the specifying table, it is possible to quickly carry out the printing at the printing apparatus 1. In addition, it is possible to generate or update the specifying table if necessary when sending the print instruction to the printing apparatus 1, without making the user be aware of the generation of the specifying table.

When the printing is carried out using the paper of the substitute paper size, it is of course possible to indicate this printing which uses the substitute paper size on the display/operation unit 103 or, on the display unit of the input/output unit 6 of the host unit 3.

Next, a description will be given of the printing process, by referring to FIGS. 20 through 23. When carrying out the printing process, it is possible, for example, to print a file of the image data prestored within the printing apparatus 1, and to print the image data which is sent to the printing apparatus 1 from the host unit 3.

Figure 20:
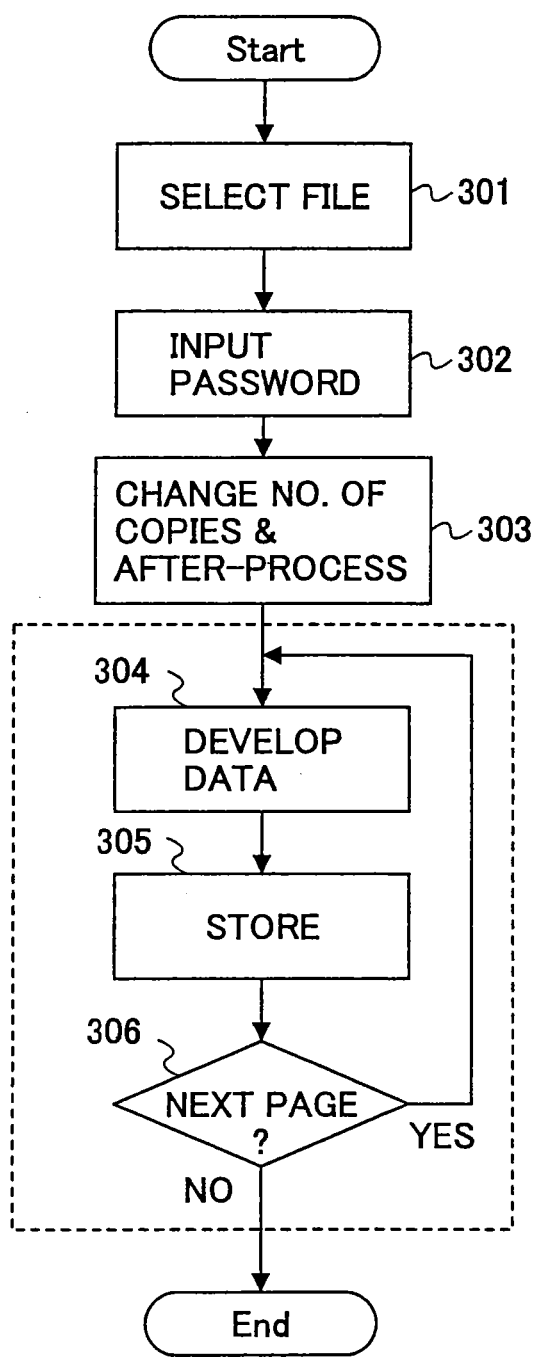
FIG. 20 is a flow chart for explaining the operation of the embodiment.
Figure 21:
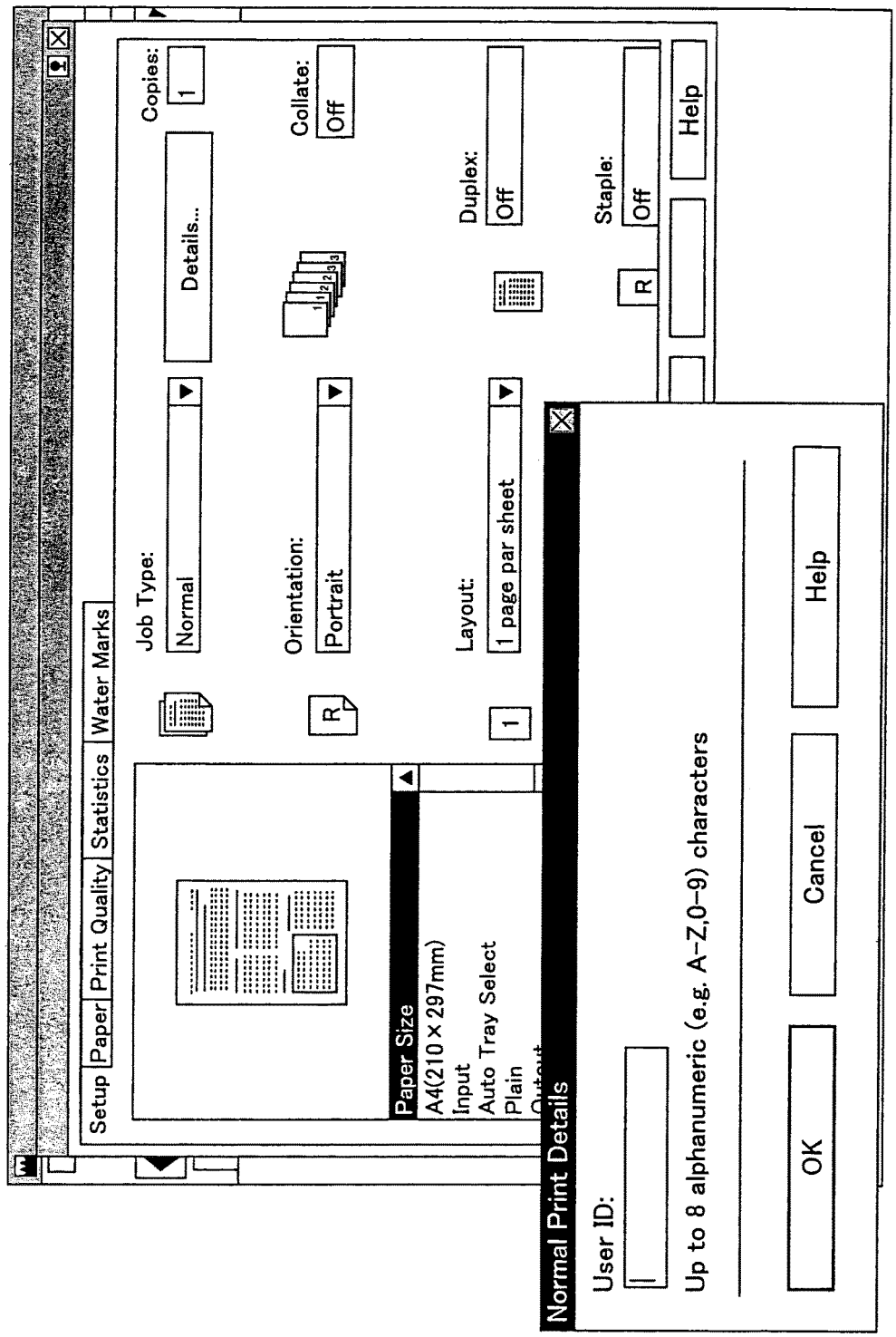
FIG. 21 is a diagram showing a user ID input menu.

FIG. 20 is a flow chart for explaining the printing process for a case where the file of the image data is prestored in the memory 108 or the data storage unit 107 of the printing apparatus 1. In FIG. 20, in a step 301, the user selects from the input/output unit 6, a file of the image data to be printed, of files prestored within the printing apparatus 1. In a step 302, the user inputs the user ID as a password, for example, on a user ID input menu shown in FIG. 21. Hence, a user ID input shown in FIG. 22 is transferred from the host unit 3 to the printing apparatus 1, and the user ID "00000001" is transferred in this particular case. After authentication of the password, the user operates the input/output unit 6 in a step 303, so as to input a change in the number of output copies (volumes) of the file, a change in the after-process and the like, and then instructs the printing of the selected file.

After the step 303, steps 304 through 306 which are surrounded by a dotted line in FIG. 20 are carried out in the printing apparatus 1. The step 304 reads the image data of the selected file amounting to one page from the memory 108 or the data storage unit 107, and develops the image data by the image forming unit 109. The step 305 stores the developed image data in the memory 108. The step 306 decides whether or not a next page of the file exists, and the process returns to the step 304 if the decision result is YES. On the other hand, if the decision result in the step 306 is NO, the process advances to the printing operation described above in conjunction with FIGS. 16 through 19 by starting from the step 401 shown in FIG. 16, at a timing which is instructed from the host unit 3 or determined by the printing apparatus 1.

Figure 23:
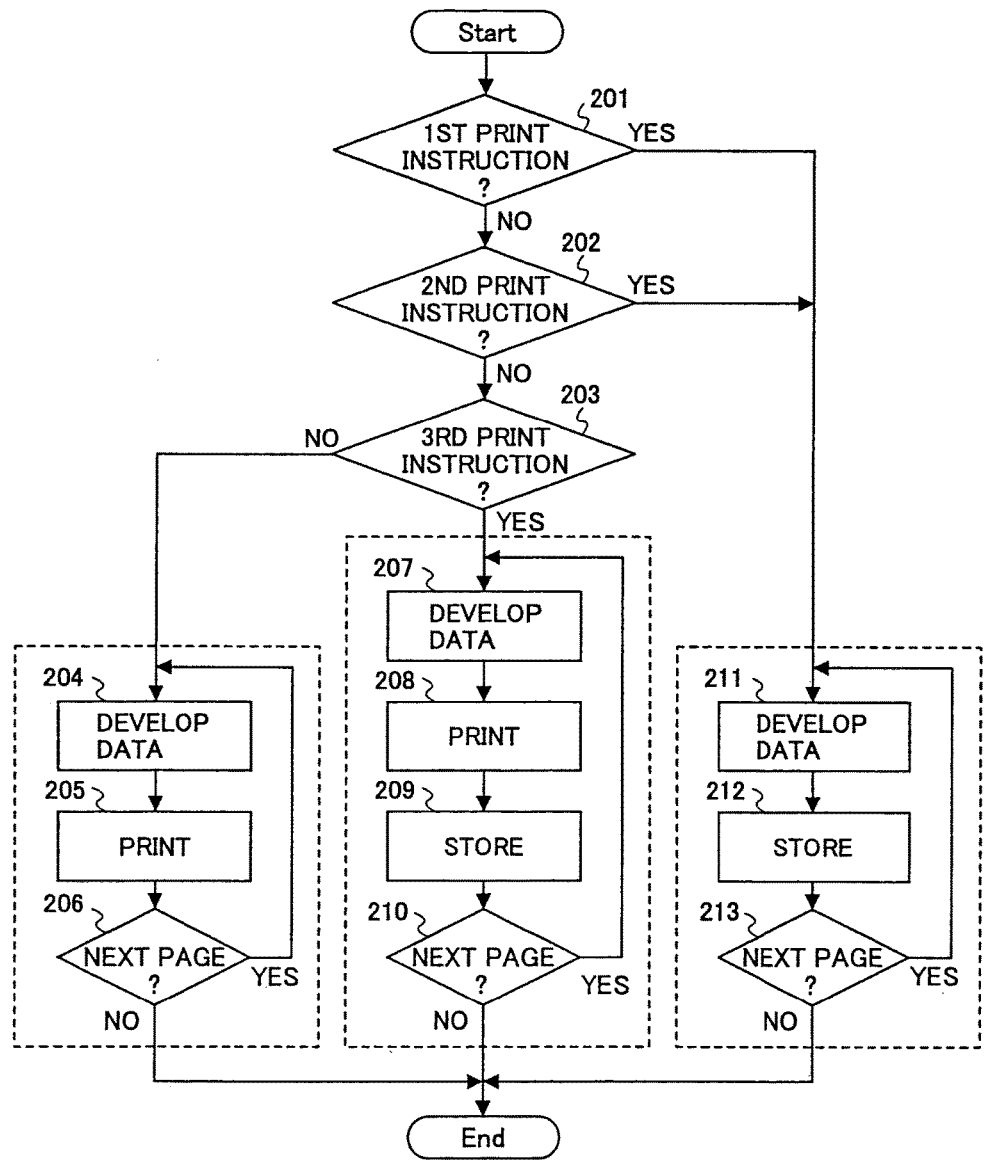
FIG. 23 is a flow chart for explaining a printing process for a file which is transferred from the host unit to the printing apparatus.

FIG. 23 is a flow chart for explaining the printing process for a case where the file of the image data to be printed is transferred from the host unit 3 to the printing apparatus 1. In FIG. 23, a step 201 decides whether or not the print instruction is a first print instruction which instructs the printing at a timing determined by the printing apparatus 1, and the printing apparatus 1 carries out steps 211 through 213 surrounded by a dotted line in FIG. 23 if the decision result is YES. The step 211 stores in the memory 108 or the data storage unit 107 the image data of the file transferred from the host unit 3 together with the print instruction, reads the image data amounting to one page, and develops the image data by the image forming unit 109. The step 212 stores the developed image data in the memory 108. The step 213 decides whether or not a next page of the file exists, and the process returns to the step 211 if the decision result is YES. On the other hand, if the decision result in the step 213 is NO, the process advances to the printing operation described above in conjunction with FIGS. 16 through 19 by starting from the step 401 shown in FIG. 16, at a timing which is determined by the printing apparatus 1.

If the decision result in the step 201 is NO, a step 202 decides whether or not the print instruction is a second print instruction which prestores the file of the image data in the memory 108 or the data storage unit 107 of the printing apparatus 1 and thereafter prints the file when the printing of this file is selected. If the decision result in the step 202 is YES, the above described steps 211 through 213 are carried out in the printing apparatus 1, and a print instruction which instructs printing of the prestored file as in the case shown in FIG. 20 is waited.

On the other hand, if the decision result in the step 202 is NO, a step 203 decides whether or not the print instruction is a third print instruction which instructs storing of the file and the printing of the file at a timing instructed from the host unit 2. If the decision result in the step 203 is NO, it is judged that the print instruction is a fourth print instruction which instructs printing of the file at a timing instructed from the host unit 3, and steps 204 through 206 surrounded by a dotted line in FIG. 23 are carried out in the printing apparatus 1. The step 204 stores in the memory 108 or the data storage unit 107 the image data of the file transferred from the host unit 3 together with the print instruction, reads the image data amounting to one page, and develops the image data by the image forming unit 109. The step 205 prints the developed image data by the printer section 109. The step 206 decides whether or not a next page of the file exists, and the process returns to the step 204 if the decision result is YES. The step 205 carries out the printing operation described above in conjunction with FIGS. 16 through 19 by starting from the step 401 shown in FIG. 16, at a timing which is instructed from the host unit 3.

If the decision result in the step 203 is YES, steps 207 through 210 surrounded by a dotted line in FIG. 23 are carried out in the printing apparatus 1. The step 207 stores in the memory 108 or the data storage unit 107 the image data of the file transferred from the host unit 3 together with the print instruction, reads the image data amounting to one page, and develops the image data by the image forming unit 109. The step 208 prints the developed image data by the printer section 109. The step 209 stores the printed image data in the memory 108 or the data storage unit 107. The step 210 decides whether or not a next page of the file exists, and the process returns to the step 207 if the decision result is YES. The step 208 carries out the printing operation described above in conjunction with FIGS. 16 through 19 by starting from the step 401 shown in FIG. 16, at a timing which is instructed from the host unit 3.

In each of the embodiments described above, the present invention is applied to a printing apparatus. However, the application of the present invention is not limited to the printing apparatus, and the present invention is similarly applicable to image forming apparatuses having at least a function of printing images on recording media such as paper. Such image forming apparatuses include copying machines, facsimile machines, and composite apparatuses provided with multiple functions (multi-function apparatuses).

In addition, the computer-readable storage medium which stores the computer program for realizing the present invention is not limited to a particular type of media, and various types of recording media may be used, including magnetic recording media, optical recording media, magneto-optical recording media, and semiconductor memory devices. In addition, the computer program may be acquired via transmission media.

Further, the present invention is not limited to these embodiments but various variations and modifications may be made without departing from the scope of the present invention.

What is claimed is:

1. An image processing apparatus communicable with a host, comprising:
   a memory configured to store a plurality of image data; and
   a processor configured to perform a process including
      deciding whether image data received from the host is to be printed upon receipt, or is to be stored in the memory, based on an instruction received from the host;
      accepting selection information that is received from the host in response to a user's selection at the host and selects one of the plurality of image data stored in the memory;
      accepting a change in printing of the one of the plurality of image data selected by the selection information, wherein the change in printing is received from the host in response to a user's input at the host indicating the change; and
      printing, by a printer, the one of the plurality of image data stored in the memory and selected by the selection information.

2. The image processing apparatus as claimed in claim 1, wherein the instruction instructs whether the image data is to be stored in the memory and also whether a print timing at which the image data is to be printed by the printer is determined by the host or the image processing apparatus.

3. The image processing apparatus as claimed in claim 1, wherein the instruction includes
  a first instruction which instructs storing the image data in the memory to be printed afterwards by the printer,
  a second instruction which instructs printing the image data by the printer, and
  a third instruction which instructs storing the image data in the memory and printing the image data by the printer.

4. The image processing apparatus as claimed in claim 3, wherein the deciding causes the image data to be stored in the memory, to be subjected to a processing including developing the image data, in response to receiving one of the first and third instructions.

5. The image processing apparatus as claimed in claim 3, wherein the deciding causes the image data to be printed by the printer, to be subjected to a processing including developing the image data, in response to receiving one of the second and third instructions.

6. The image processing apparatus as claimed in claim 1, further comprising:
  the printer,
  wherein the accepting the change accepts a change in a number of output printed material or volumes of a file.

7. The image processing apparatus as claimed in claim 1, wherein the image data stored in the memory is printed after the selection information that selects the one of the plurality of image data is received.

8. The image processing apparatus as claimed in claim 3, wherein the second instruction instructs printing the image data by the printer without saving the image data in the memory.

9. An image forming system comprising:
  a host; and
  an image processing apparatus communicable with the host,
  wherein the host includes an input device, and a first processor configured to send an instruction and image data to the image processing apparatus in response to inputs to the first processor from the input device, and
  wherein the image processing apparatus includes
    a memory configured to store a plurality of image data; and
    a second processor configured to perform a process including
      deciding whether the image data received from the host is to be printed upon receipt, or is to be stored in the memory, based on the instruction received from the host;
      accepting selection information that selects one of the plurality of image data stored in the memory, wherein the selection information is received from the first processor of the host in response to a selection that selects the one of the plurality of image data and is input to the first processor from the input device;
      accepting a change in printing of the one of the plurality of image data selected by the selection information, wherein the change in printing is received from the first processor of the host in response to an input that indicates the change and is input to the first processor from the input device; and
      printing, by a printer, the one of the plurality of image data stored in the memory and selected by the selection information.

10. The image forming system as claimed in claim 9, wherein the first processor of the host is configured to send at least one of the selection information and the change in printing to the image processing apparatus when the input device is operated by a user to send the at least one of the selection information and the change in printing.

11. The image forming system as claimed in claim 9, wherein the instruction instructs whether the image data is to be stored in the memory and also whether a print timing at which the image data is to be printed by the printer is determined by one of the host and the image processing apparatus.

12. The image forming system as claimed in claim 9, wherein the instruction includes
  a first instruction which instructs storing the image data in the memory to be printed afterwards by the printer,
  a second instruction which instructs printing the image data by the printer, and
  a third instruction which instructs storing the image data in the memory and printing the image data by the printer.

13. The image forming system as claimed in claim 12, wherein the deciding causes the image data to be stored in the memory, to be subjected to a processing including developing the image data, in response to receiving one of the first and third instructions.

14. The image forming system as claimed in claim 12, wherein the deciding causes the image data to be printed by the printer, to be subjected to a processing including developing the image data, in response to receiving one of the second and third instructions.

15. The image forming system as claimed in claim 9, wherein the image processing apparatus further includes the printer,
  wherein the accepting the change accepts a change in a number of output printed material or volumes of a file.

16. The image forming system as claimed in claim 9, wherein the image data stored in the memory is printed after the selection information that selects the one of the plurality of image data is received.

17. The image forming system as claimed in claim 12, wherein the second instruction instructs printing the image data by the printer without saving the image data in the memory.

18. A printing method comprising:
  sending an instruction and image data from a host to an image processing apparatus in response to inputs to the host from an input device;
  deciding, by the image processing apparatus, whether the image data received from the host is to be printed upon receipt, or is to be stored in the image processing apparatus, based on the instruction received from the host;
  accepting selection information that selects one of a plurality of image data stored in the image processing apparatus, wherein the selection information is received from the host in response to a selection that selects the one of the plurality of image data and is input to the host from the input device;
  accepting a change in printing of the one of the plurality of image data selected by the selection information, wherein the change in printing is received from the host in response to an input that indicates the change and is input to the host from the input device; and
  printing, by a printer, the one of the plurality of image data stored in the image processing apparatus and selected by the selection information.

19. The printing method as claimed in claim 18, further comprising:
  selecting, by the host, the image data to be printed from the plurality of image data stored in the image processing apparatus, based on the selection input to the host from the input device, and outputting the selection information to the image processing apparatus.

20. The printing method as claimed in claim 18, wherein the instruction instructs whether the image data is to be stored in the image processing apparatus and also whether a print timing at which the image data is to be printed by the printer is determined by one of the host and the image processing apparatus.

21. The printing method as claimed in claim 18, wherein the instruction includes
  a first instruction which instructs storing the image data in the image processing apparatus to be printed afterwards by the printer,
  a second instruction which instructs printing the image data by the printer, and
  a third instruction which instructs storing the image data in the image processing apparatus and printing the image data by the printer.

22. The printing method as claimed in claim 21, wherein the deciding causes the image data to be stored in the image processing apparatus, to be subjected to a processing including developing the image data, in response to receiving one of the first and third instructions.

23. The printing method as claimed in claim 21, wherein the deciding causes the image data to be printed by the printer, to be subjected to a processing including developing the image data, in response to receiving one of the second and third instructions.

24. The printing method as claimed in claim 18, wherein the accepting the change accepts a change in a number of output printed material or volumes of a file.

25. The printing method as claimed in claim 18, wherein the image data stored in the image processing apparatus is printed after the selection information that selects the one of the plurality of image data is received.

26. The printing method as claimed in claim 21, wherein the second instruction instructs printing the image data by the printer without saving the image data in the image processing apparatus.

* * * * *